United States Patent
Monden et al.

(10) Patent No.: US 12,139,578 B2
(45) Date of Patent: Nov. 12, 2024

(54) COVER FOR MILLIMETER-WAVE RADAR AND MILLIMETER-WAVE RADAR MODULE INCLUDING THE SAME

(71) Applicant: Mitsubishi Chemical Corporation, Tokyo (JP)

(72) Inventors: Toshiki Monden, Chiyoda-ku (JP); Morio Tsunoda, Chiyoda-ku (JP); Hiroyuki Tajima, Hiratsuka (JP); Tatsuya Kikuchi, Hiratsuka (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 813 days.

(21) Appl. No.: 17/047,596

(22) PCT Filed: Apr. 24, 2019

(86) PCT No.: PCT/JP2019/017457
§ 371 (c)(1),
(2) Date: Oct. 14, 2020

(87) PCT Pub. No.: WO2019/212020
PCT Pub. Date: Nov. 7, 2019

(65) Prior Publication Data
US 2021/0147622 A1    May 20, 2021

(30) Foreign Application Priority Data
May 2, 2018 (JP) ................. 2018-088583

(51) Int. Cl.
*C08G 64/06* (2006.01)
*G01S 7/03* (2006.01)
*H01Q 1/42* (2006.01)

(52) U.S. Cl.
CPC ............. *C08G 64/06* (2013.01); *G01S 7/03* (2013.01); *H01Q 1/42* (2013.01)

(58) Field of Classification Search
None
See application file for complete search history.

(56) References Cited

U.S. PATENT DOCUMENTS

| | | | |
|---|---|---|---|
| 6,107,976 A | 8/2000 | Purinton | |
| 7,126,525 B2 | 10/2006 | Suzuki et al. | |
| 9,617,416 B2 | 4/2017 | Tajima | |
| 2004/0227663 A1 | 11/2004 | Suzuki et al. | |
| 2008/0309579 A1* | 12/2008 | Maeda ................ | H01Q 1/3291 343/872 |
| 2015/0210851 A1 | 7/2015 | Tajima | |

FOREIGN PATENT DOCUMENTS

| | | |
|---|---|---|
| DE | 10 2014 213 502 A1 | 1/2016 |
| JP | 2004-312696 A | 11/2004 |
| JP | 2011-71881 A | 4/2011 |
| JP | 2013-43942 A | 3/2013 |
| JP | 2014-51551 A | 3/2014 |
| JP | 2014-65901 A | 4/2014 |
| JP | 2016-121307 A | 7/2016 |
| JP | 2016-121334 A | 7/2016 |
| JP | 2016-182866 A | 10/2016 |

OTHER PUBLICATIONS

JP2011071881 translation (Year: 2011).*
Extended European Search Report issued Sep. 24, 2021 in European Patent Application No. 19796323.4, citing documents AO, AP, and AX therein, 7 pages.
Bill Riddle, et al., "Complex Permittivity Measurements of Common Plastics Over Variable Temperatures," IEEE Transactions on Microwave Theory and Techniques, vol. 51, No. 3, Mar. 2003, XP055317337, pp. 727-733.
International Search Report issued Jul. 23, 2019 in PCT/JP2019/017457 filed Apr. 24, 2019, citing documents AA-AE, AO, AQ and AS-AT therein, 2 pages.

* cited by examiner

*Primary Examiner* — Whitney Moore
(74) *Attorney, Agent, or Firm* — Oblon, McClelland, Maier & Neustadt, L.L.P.

(57) ABSTRACT

There is provided a cover for a millimeter-wave radar, the cover being provided on an antenna that transmits and/or receives a millimeter wave of 75 to 81 GHz, the cover containing a thermoplastic resin composition that contains an aromatic polycarbonate resin having a structural unit (A) represented by formula (1) below, the cover having a relative dielectric constant $\varepsilon_r$ of 3.0 or less, a dielectric loss tangent tan $\delta$ of $8.0 \times 10^{-3}$ or less, and a loss factor $\varepsilon_r \cdot \tan \delta$ of $17.0 \times 10^{-3}$ or less:

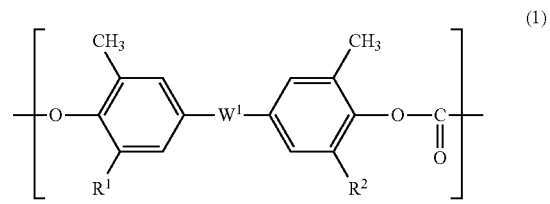

(1)

where in formula (1), $R^1$ and $R^2$ are each a hydrogen atom or a methyl group, and $W^1$ is at least one selected from a single bond, an oxygen atom, a sulfur atom, and a divalent organic group.

8 Claims, No Drawings

COVER FOR MILLIMETER-WAVE RADAR AND MILLIMETER-WAVE RADAR MODULE INCLUDING THE SAME

TECHNICAL FIELD

The present invention relates to a cover for a millimeter-wave radar, the cover having excellent millimeter-wave transparency, high hardness, and excellent heat resistance and being disposed in the beam path of a millimeter-wave transceiver, and a millimeter-wave radar module including the cover for a millimeter-wave radar.

BACKGROUND ART

Millimeter-wave radars transmit radio waves having a frequency of 30 to 300 GHz and a wavelength of 1 to 10 mm and receive reflected waves that reflect off objects and return to the radars to detect the presence of obstacles and distances and relative speeds to targets. Millimeter-wave radars should be used in a wide range of fields, such as crash prevention sensors for automobiles, automated driving systems, road information providing systems, security systems, and medical and nursing care devices.

Millimeter-wave radar modules each include an antenna module that transmits or receives millimeter waves, a housing that houses or protects the antenna module, and an antenna cover what is called a radome. In this specification, these housings and antenna covers are referred to as covers for millimeter-wave radars. In the case where such a millimeter-wave radar module is used for an automotive sensor, the millimeter-wave radar module is often mounted on the back of an emblem disposed on the front portion of an automobile. In this case, the emblem can also be regarded as part of the cover for a millimeter-wave radar.

Covers for millimeter-wave radars are typically formed of resin molded articles and have various shapes in accordance with applications. In the case of insufficient millimeter-wave transparency, millimeter waves transmitted from a transmitting and receiving antenna and reflected waves are attenuated to decrease the detection accuracy of an object, thereby failing to provide sufficient performance as a millimeter-wave radar. Accordingly, covers for millimeter-wave radars are strongly required to have higher millimeter-wave transparency.

As a cover for a millimeter-wave radar, for example, a cover composed of a polybutylene terephthalate resin composition as reported in Patent Literature 1 is commonly well known. A polybutylene terephthalate resin has low dimensional stability and high water absorption and thus has a disadvantage in that millimeter-wave transparency is not stable. Furthermore, it also has low hydrolysis resistance and low hygrothermal stability and thus disadvantageously has poor long-term reliability.

Patent Literature 2 states that typically, a resin having a relative dielectric constant of 3 or less is preferably used in order to improve the millimeter-wave transparency and examples of the resin include polycarbonate, styrene-based resins, such as syndiotactic polystyrene and ABS resins, and polypropylene. Patent Literature 3 reports that only a low relative dielectric constant is insufficient for millimeter-wave transparency, the dielectric loss tangent is preferably low, and as a solution to this, a cover, for a millimeter-wave radar, composed of a polycarbonate resin composition containing specific alumina particles is used.

Patent Literature 1 states that the polybutylene terephthalate resin composition has a relative dielectric constant of 3.1 to 3.4 and a dielectric loss tangent of $7 \times 10^{-3}$. Patent Literature 3 states that a polycarbonate resin has a relative dielectric constant of 2.7 and a dielectric loss tangent of $12.3 \times 10^{-3}$ and even the polycarbonate resin composition containing specific alumina has a relative dielectric constant of 3.7 and a dielectric loss tangent of $9.3 \times 10^{-3}$. However, these covers cannot satisfy both the low relative dielectric constant and low dielectric loss tangent that are currently required for covers for millimeter-wave radars. Thus, a cover having higher millimeter-wave transparency is desired.

Patent Literature 4 reports a millimeter-wave radome composed of a resin composition containing a styrene-based resin and a polyolefin, the resin composition having a relative dielectric constant of 2.5 to 2.7 and a dielectric loss tangent of $3.7 \times 10^{-3}$ to $8.5 \times 10^{-3}$. This radome has extremely low heat resistance and thus cannot be practically used.

PTL 1: Japanese Unexamined Patent Application Publication No. 2013-43942
PTL 2: Japanese Unexamined Patent Application Publication No. 2004-312696
PTL 3: Japanese Patent No. 5293537
PTL 4: Japanese Unexamined Patent Application Publication No. 2016-121307

In recent years, especially in automotive applications, social infrastructure applications, and medical and nursing care applications, millimeter-wave radar frequencies have been increased in order to increase the distance to a detectable object and improve the maximum resolution. The use of high-frequency millimeter waves of 76 to 81 GHz is promising, compared with the conventional 22 to 29 GHz and 60 to 61 GHz bands.

In such a high-frequency region, the use of conventional covers for millimeter-wave radars does not provide millimeter-wave radar modules having sufficient performance because transmission attenuation for millimeter waves is particularly increased. In millimeter-wave radar modules, an extended frequency bandwidth has recently been used. Thus, covers for millimeter-wave radars are required to have a weak dependence of millimeter-wave transparency on frequency. However, covers that meet these demands for millimeter-wave radars have not yet been made.

In the case where covers for millimeter-wave radars are used especially in automotive applications and social infrastructure applications, high hardness, scratch resistance, and heat resistance are required in addition to the above millimeter-wave transparency. However, a cover, for a millimeter-wave radar, having excellent millimeter-wave transparency, excellent heat resistance, and scratch resistance has not yet been found.

SUMMARY OF INVENTION

The present invention has been accomplished in light of the foregoing problems and aims to provide a cover for a millimeter-wave radar, the cover having excellent millimeter-wave transparency in the high frequency range of 76 to 81 GHz, high hardness, and excellent heat resistance, and to provide a millimeter-wave radar module including the cover.

The inventors have found that a cover for a millimeter-wave radar can be provided, the cover being composed of a thermoplastic resin composition containing an aromatic polycarbonate resin having a specific structural unit, the cover having an optimally designed thickness in accordance with a frequency used, excellent millimeter-wave transparency in the high frequency band of 76 to 81 GHz, high hardness, and excellent heat resistance.

The gist of the present invention lies in [1] to [7] below.

[1] A cover for a millimeter-wave radar, the cover being provided on an antenna that transmits and/or receives a millimeter wave of 75 to 81 GHz, comprising a thermoplastic resin composition containing an aromatic polycarbonate resin having a structural unit (A) represented by formula (1) below, the cover having a relative dielectric constant $\varepsilon_r$ of 3.0 or less, a dielectric loss tangent tan δ of $8.0 \times 10^{-3}$ or less, and a loss factor $\varepsilon_r \cdot \tan \delta$ of $17.0 \times 10^{-3}$ or less:

[Chem. 1]

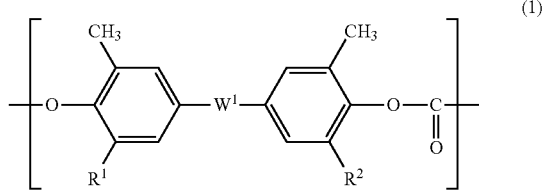

(1)

where in formula (1), $R^1$ and $R^2$ are each a hydrogen atom or a methyl group, and $W^1$ is at least one selected from a single bond, an oxygen atom, a sulfur atom, and a divalent organic group.

[2] The cover for a millimeter-wave radar according to [1], wherein the structural unit (A) is represented by formula (3) or (4) below:

[Chem. 2]

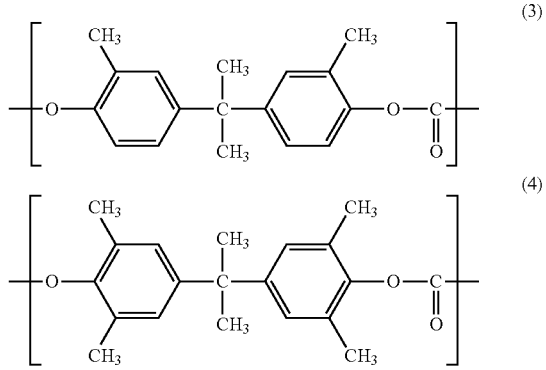

(3)

(4)

[3] The cover for a millimeter-wave radar according to [1] or [2], wherein the amount of the structural unit (A) contained in the aromatic polycarbonate resin is 20 mol % or more based on all carbonate structural units.

[4] The cover for a millimeter-wave radar according to any one of [1] to [3], wherein the cover has a transmission attenuation of −1.20 (dB) or more at a thickness of 3 mm in a frequency band of 75 to 81 GHz.

[5] The cover for a millimeter-wave radar according to any one of [1] to [4], wherein a difference ΔIL ($|IL_{MAX} - IL_{MIN}|$) between a maximum transmission attenuation $IL_{MAX}$ and a minimum transmission attenuation $IL_{MIN}$ at a thickness of 3 mm in a frequency band of 75 to 81 GHz is 0.70 (dB) or less.

[6] The cover for a millimeter-wave radar according to any one of [1] to [5], wherein the cover is a housing or an antenna cover that houses or protects an antenna module configured to transmit and/or receive a millimeter wave of 75 to 81 GHz.

[7] A millimeter-wave radar module, comprising the cover for a millimeter-wave radar according to any one of [1] to [6].

Advantageous Effects of Invention

According to the present invention, it is possible to provide the cover for a millimeter-wave radar, the cover having excellent millimeter-wave transparency in the high frequency band of 75 to 81 GHz, only a little change in millimeter-wave transparency in the range of 75 to 81 GHz, high hardness, and excellent heat resistance, and to provide a millimeter-wave radar module including the cover. The millimeter-wave radar module can be widely used, for example, for millimeter-wave radars for various on-vehicle sensors, millimeter-wave radars for railroads and aircraft, millimeter-wave radars in the fields of traffic, medical and nursing care, security, and information content transmission.

DESCRIPTION OF EMBODIMENTS

While the present invention will be described in detail below with reference to embodiments and illustrations, the present invention should not be construed as being limited to the embodiments and illustrations below.

In this specification, numeric values preceding and succeeding the term "to" are used to indicate the maximum and minimum values, inclusive, of a range, unless otherwise specified. The term "part(s)" indicates part(s) by mass on a mass basis, unless otherwise specified.

A cover for a millimeter-wave radar according to the present invention is a cover provided on an antenna that transmits and/or receives a millimeter wave of 75 to 81 GHz. The millimeter wave of such a high frequency band has a smaller wavelength than a conventionally used millimeter wave of 22 to 61 GHz. The size of an antenna and a circuit is determined by the wavelength. Thus, a reduction in the size of a radar module can be achieved by the use of such a millimeter wave. The band can have a wide bandwidth. Thus, the range resolution can be improved using the wide frequency bandwidth. Specifically, a 77-GHz millimeter-wave radar has a range resolution of about 1 to 2 m. The range resolution of a 79-GHz millimeter-wave radar can be improved to about 20 cm.

The cover for a millimeter-wave radar according to the present invention includes a housing that houses or protects an antenna module configured to transmit or receive a millimeter wave, an antenna cover (radome), and a member disposed on the path between a millimeter-wave radar module including them and an object to be sensed by the millimeter wave (for example, a cover, an automotive exterior member, and an emblem disposed on the path of the millimeter wave that is transmitted and received by the millimeter-wave radar module when the cover is used for an automotive sensor). These covers may be separately stacked with a hard coating that transmits the millimeter wave and may be subjected to metal vapor deposition.

A cover for a millimeter-wave radar according to the present invention is provided on an antenna that transmits and/or receives a millimeter wave of 75 to 81 GHz, the cover being composed of a thermoplastic resin composition containing an aromatic polycarbonate resin having a structural unit (A) represented by formula (1) below (hereinafter, also referred to as an "aromatic polycarbonate resin (A)"), the cover having a relative dielectric constant $\varepsilon_r$ of 3.0 or less, a dielectric loss tangent tan δ of $8.0 \times 10^{-3}$ or less, and a loss factor $\varepsilon_r \cdot \tan \delta$ of $17.0 \times 10^{-3}$ or less.

[Chem. 3]

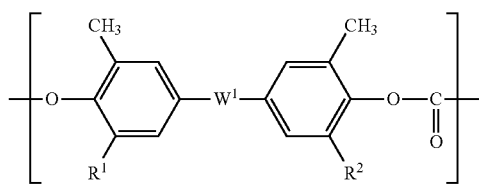
(1)

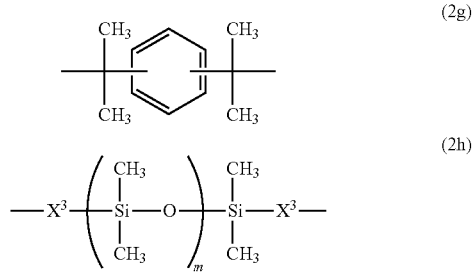

In formula (1), $R^1$ and $R^2$ are each a hydrogen atom or a methyl group. When $R^1$ and $R^2$ are each a hydrogen atom, the cover for a millimeter-wave radar according to the present invention tends to have improved weather resistance. When $R^1$ and $R^2$ are each a methyl group, the cover for a millimeter-wave radar according to the present invention tends to have improved heat resistance and hygrothermal resistance. Thus, $R^1$ and $R^2$ may be appropriately selected as required and, more preferably, are each a hydrogen atom.

In formula (1), $W^1$ is at least one selected from a single bond, an oxygen atom, a sulfur atom, and a divalent organic group. The divalent organic group is not particularly limited as long as it is a conventionally known divalent organic group, and can be appropriately selected and used. Examples thereof include organic groups represented by formulae (2a) to (2h).

[Chem. 4]

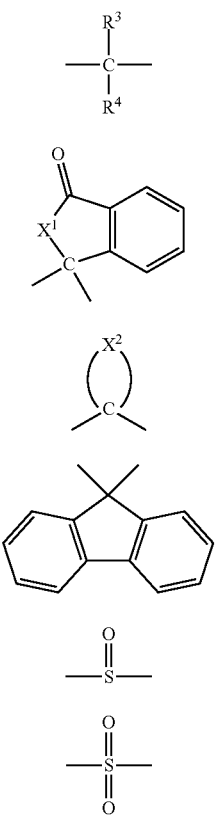

In formula (2a), $R^3$ and $R^4$ are each independently a hydrogen atom, a monovalent hydrocarbon group having 1 to 24 carbon atoms, or an alkoxy group having 1 to 24 carbon atoms. Among these, the monovalent hydrocarbon group having 1 to 24 carbon atoms is preferred.

Examples of the monovalent hydrocarbon group having 1 to 24 carbon atoms include alkyl groups having 1 to 24 carbon atoms, alkenyl groups having 2 to 24 carbon atoms, optionally substituted aryl groups having 6 to 24 carbon atoms, and aralkyl groups having 7 to 24 carbon atoms.

Examples of alkyl groups having 1 to 24 carbon atoms include linear or branched alkyl groups and alkyl groups having a partially cyclic structure. Among these, linear alkyl groups are preferred. Examples of alkyl groups having 1 to 24 carbon atoms include a methyl group, an ethyl group, a n-propyl group, a n-butyl group, a n-pentyl group, a n-hexyl group, a n-heptyl group, and a n-octyl group. A methyl group is preferred.

Examples of alkenyl groups having 2 to 24 carbon atoms include linear or branched alkenyl groups and alkenyl groups having a partially cyclic structure. Among these, linear alkenyl groups are preferred. Examples of linear alkenyl groups having 2 to 24 carbon atoms include a vinyl group, a n-propenyl group, a n-butenyl group, a n-pentenyl group, a n-hexenyl group, a n-heptenyl group, and a n-octenyl group. A vinyl group is preferred.

Examples of aryl groups having 6 to 24 carbon atoms include aryl groups, such as a phenyl group, a naphthyl group, a methylphenyl group, a dimethylphenyl group, and a trimethylphenyl group, optionally substituted with, for example, an alkyl group. An example of aralkyl groups having 7 to 24 carbon atoms is a benzyl group.

Examples of alkoxy groups having 1 to 24 carbon atoms include linear or branched alkoxy groups and alkoxy groups having a partially cyclic structure. Among these, linear alkoxy groups are preferred. Specific examples of linear alkoxy groups include a methoxy group, an ethoxy group, a propoxy group, and a butoxy group.

In formula (2b), $X^1$ is an oxygen atom or $NR^a$. Here, $R^a$ is defined the same as $R^3$ and $R^4$ described above.

In formula (2c), $X^2$ is a divalent hydrocarbon having 3 to 18 carbon atoms. Examples thereof include a propylene group, a butylene group, a pentylene group, a hexylene group, a heptylene group, an octylene group, a nonylene group, a decylene group, an undecylene group, and a dodecylene group, each group optionally having a substituent. Examples of the substituent include a methyl group, an ethyl group, a propyl group, a butyl group, a pentyl group, and a phenyl group. Furthermore, a partially cross-linked structure may be contained.

In formula (2h), each $X^3$ is an alkylene group having 1 to 7 carbon atoms. The alkylene group may be linear or branched or may have a cyclic structure. Examples thereof include a methylene group, an ethylene group, a propylene group, and a butylene group.

m is an integer of 1 to 500, preferably 5 to 300, more preferably 10 to 100.

Specific examples of the structural unit (A) include structural units originating from aromatic dihydroxy compounds (a), such as:
bis(4-hydroxy-3-methylphenyl)methane,
bis(4-hydroxy-3,5-dimethylphenyl)methane,
1,1-bis(4-hydroxy-3-methylphenyl)ethane,
1,1-bis(4-hydroxy-3,5-dimethylphenyl)ethane,
2,2-bis(4-hydroxy-3-methylphenyl)propane,
2,2-bis(4-hydroxy-3,5-dimethylphenyl)propane,
2,2-bis(4-hydroxy-3-isopropylphenyl)propane,
2,2-bis(4-hydroxy-3-methylphenyl)butane,
2,2-bis(4-hydroxy-3,5-dimethylphenyl)butane,
1,3-bis(2-(4-hydroxy-3-methylphenyl)-2-propyl)benzene,
1,4-bis(2-(4-hydroxy-3-methylphenyl)-2-propyl)benzene,
1,1-bis(4-hydroxy-3-methylphenyl)cyclohexane,
1,1-bis(4-hydroxy-3,5-dimethylphenyl)cyclohexane,
1,1-bis(4-hydroxy-3-methylphenyl)-3,3,5-trimethylcyclohexane,
1,1-bis(4-hydroxy-3,5-dimethylphenyl)-3,3,5-trimethylcyclohexane,
bis(4-hydroxy-3-methylphenyl)diphenylmethane,
9,9-bis(4-hydroxy-3-methylphenyl)fluorene,
9,9-bis(4-hydroxy-3,5-dimethylphenyl)fluorene,
bis(4-hydroxy-3-methylphenyl) sulfone,
3,3-bis(4-hydroxy-3-methylphenyl)phthalide,
2-methyl-3,3'-bis(4-hydroxy-3-methylphenyl)phthalimidine,
2-phenyl-3,3'-bis(4-hydroxy-3-methylphenyl)phthalimidine,
4,4'-dihydroxy-3,3'-dimethylbiphenyl, and
4,4'-dihydroxy-3,3',5,5'-tetramethylbiphenyl.

Of these, the aromatic dihydroxy compound (a) is preferably 2,2-bis(4-hydroxy-3-methylphenyl)propane, 2,2-bis(4-hydroxy-3,5-dimethylphenyl)propane, 1,1-bis(4-hydroxy-3-methylphenyl)cyclohexane, 1,1-bis(4-hydroxy-3-methylphenyl)-3,3,5-trimethylcyclohexane, more preferably 2,2-bis(4-hydroxy-3-methylphenyl)propane and 2,2-bis(4-hydroxy-3,5-dimethylphenyl)propane, even more preferably 2,2-bis(4-hydroxy-3-methylphenyl)propane.

That is, the structural unit (A) is more preferably a structural unit represented by formula (3) or (4) below, even more preferably a structural unit represented by formula (3) below.

[Chem. 5]

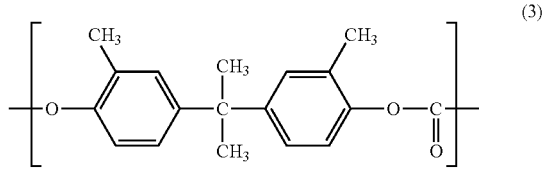

(3)

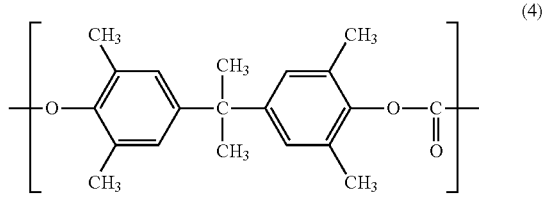

(4)

In the case where the cover for a millimeter-wave radar according to the present invention contains the structural unit (A) originating from the aromatic dihydroxy compound (a), the cover for a millimeter-wave radar according to the present invention has excellent millimeter-wave transparency, heat resistance, and strength.

The aromatic polycarbonate resin (A) may contain a structural unit (B) other than the foregoing structural unit (A) to the extent that the characteristics of the cover for a millimeter-wave radar according to the present invention are not impaired. Examples of the structural unit (B) include structural units represented by formulae (5) and (6) below.

[Chem. 6]

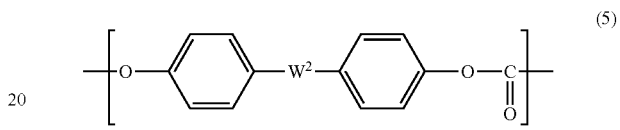

(5)

In formula (5), $W^2$ is defined the same as $W^1$ described above.

[Chem. 7]

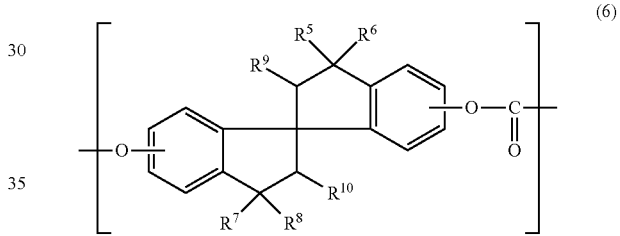

(6)

In formula (6), $R^5$, $R^6$, $R^7$, $R^8$, $R^9$, and $R^{10}$ are each independently at least one selected from a hydrogen atom and alkyl groups having 1 to 6 carbon atoms. Among these, alkyl groups having 1 to 6 carbon atoms are preferred. Examples of alkyl groups having 1 to 6 carbon atoms include a methyl group, an ethyl group, and a propyl group. The structural unit (B) represented by formula (6) is preferably a structural unit in which $R^5$, $R^6$, $R^7$, and $R^8$ are each a methyl group and $R^9$ and $R^{10}$ are each a hydrogen atom.

Specific examples of the structural unit (B) include structural units originating from aromatic dihydroxy compounds (b), such as 2,2-bis(4-hydroxyphenyl)propane (bisphenol A), 2,2-bis(4-hydroxyphenyl)cyclohexane, 2,2-bis(4-hydroxyphenyl)-3,3,5-trimethylcyclohexane, and 6,6'-dihydroxy-3,3,3',3'-tetramethyl-1,1'-spirobiindane. Among these aromatic dihydroxy compounds (b), 2,2-bis(4-hydroxyphenyl)propane (bisphenol A) and 6,6'-dihydroxy-3,3,3',3'-tetramethyl-1,1'-spirobiindane are more preferred.

The aromatic polycarbonate resin (A) may be what is called a homopolymer consisting of only one type of structural unit (A) or a copolymer (copolymer) containing two or more types of structural units (A). Furthermore, the aromatic polycarbonate resin (A) may be a blend of a homopolymer and a homopolymer, a homopolymer and a copolymer, or a copolymer and a copolymer.

In the case where the aromatic polycarbonate resin (A) contains the structural unit (B) in addition to the structural unit (A), the aromatic polycarbonate resin (A) may be a copolymer containing one or two or more types of structural units (A) and one or two or more types of structural units (B) or a blend containing, in any desired proportion, an aromatic polycarbonate resin that contains one or two or more types of structural units (A), an aromatic polycarbonate resin that contains one or two or more types of structural units (B), and an aromatic polycarbonate resin that contains one or two or more types of structural units (A) and one or two or more types of structural units (B). However, the aromatic polycarbonate resin (A) contains a specific amount of the structural unit (A); thus, an aromatic polycarbonate resin consisting of only one or two or more types of structural units (B) is not included in the aromatic polycarbonate resin (A).

The amount of the structural unit (A) contained in the aromatic polycarbonate resin (A) is not particularly limited and can be appropriately selected as long as the characteristics of the cover for a millimeter-wave radar according to the present invention are not impaired. The amount (mol %) of the structural unit (A) contained (hereinafter, the percentage of the structural unit (A) contained in all the carbonate structural units may also be referred to simply as a "percentage of the structural unit (A)") is preferably 10 mol % or more, more preferably 20 mol % or more, even more preferably 30 mol % or more, particularly preferably 40 mol % or more, most preferably 50 mol % or more based on 100 mol % of all carbonate structural units (total of the structural unit (A) and the structural unit (B)) in the aromatic polycarbonate resin (A). In this range, the transmission attenuation for millimeter waves is advantageously reduced to easily provide a suitable cover for a millimeter-wave radar.

The molecular weight of the aromatic polycarbonate resin (A) is not particularly limited and can be appropriately selected as long as the object of the present invention is not impaired, and is usually 10,000 to 50,000 in terms of viscosity-average molecular weight (Mv) calculated from the solution viscosity. A viscosity-average molecular weight of less than the lower limit is not preferred because the cover for a millimeter-wave radar according to the present invention tends to have low mechanical strength and heat resistance. A viscosity-average molecular weight of more than the upper limit is not preferred because the flowability is significantly low and because the dimensional accuracy of the cover for a millimeter-wave radar according to the present invention tends to decrease. From such a point of view, the aromatic polycarbonate resin (A) preferably has a viscosity-average molecular weight (Mv) of 11,000 or more, more preferably 12,000 or more, even more preferably 13,000 or more, particularly preferably 14,000 or more. The aromatic polycarbonate resin (A) preferably has a viscosity-average molecular weight (Mv) of 40,000 or less, more preferably 35,000 or less, even more preferably 30,000 or less, particularly preferably 28,000 or less.

To control the viscosity-average molecular weight of the aromatic polycarbonate resin (A) within the above range, two or more types of aromatic polycarbonate resins (A) having different viscosity-average molecular weights may be mixed and used. In this case, the viscosity-average molecular weight (Mv) of the aromatic polycarbonate resin (A) may be controlled by mixing an aromatic polycarbonate resin (A) having a viscosity-average molecular weight outside the above preferred range.

The viscosity-average molecular weight (Mv) of the aromatic polycarbonate resin indicates a value obtained by determining the intrinsic viscosity (limiting viscosity) [η] (unit: dL/g) at a temperature of 20° C. with an Ubbelohde viscometer using methylene chloride serving as a solvent and then calculating Mv from Schnell's viscosity equation 1=1.23×10$^{-4}$Mv$^{0.83}$. The intrinsic viscosity (limiting viscosity) [η] is a value determined by measuring the specific viscosity [η$_{sp}$] at each solution concentration [C] (g/dL) and calculating the intrinsic viscosity from the following equation.

$$\eta = \lim_{c \to 0} \eta_{sp}/c \qquad \text{[Math. 1]}$$

A method for producing the aromatic polycarbonate resin (A) is not particularly limited and may be appropriately selected and employed as long as it is a known method. Examples of the method for producing the aromatic polycarbonate resin (A) include a melt transesterification method, an interfacial polymerization method, a pyridine method, a ring-opening polymerization method of a cyclic carbonate compound, and a solid-state transesterification method of a prepolymer. Among these, the melt transesterification method and the interfacial polymerization method are preferred. The melt transesterification method is more preferred.

The thermoplastic resin composition according to the present invention may contain other components other than the aromatic polycarbonate resin (A), as needed, as long as desired physical properties are not significantly impaired. Examples of other components include resins other than the aromatic polycarbonate resin (A) and various resin additives. Other components may be contained alone or in any combination of two or more thereof in any proportion.

Examples of resins other than the aromatic polycarbonate resin (A) include:

thermoplastic polyester resins, such as polyethylene terephthalate resins (PET resins), polytrimethylene terephthalate (PTT resins), polybutylene terephthalate resins (PBT resins);

styrene-based resins, such as polystyrene resins (PS resins), high-impact polystyrene resins (HIPS), acrylonitrile-styrene copolymers (AS resins), acrylonitrile-butadiene-styrene copolymers (ABS resins), acrylonitrile-styrene-acrylic rubber copolymers (ASA resins), and acrylonitrile-ethylene propylene-based rubber-styrene copolymers (AES resins);

polyolefin resins, such as polyethylene resins (PE resins), polypropylene resins (PP resins), cyclic cycloolefin resins (COP resins), and cyclic cycloolefin copolymer (COP) resins;

aliphatic polycarbonate resins;

polyamide resins (PA resins); polyimide resins (PI resins); polyetherimide resins (PEI resins); polyurethane resins (PU resins); polyphenylene ether resins (PPE resins); polyphenylene sulfide resins (PPS resins); polysulfone resins (PSU resins); polymethacrylate resins (PMMA resins); and liquid crystal polymers (LCPs).

These resins other than the aromatic polycarbonate resin (A) may be contained alone or in any combination of two or more in any proportion in the thermoplastic resin composition according to the present invention.

In the case where the thermoplastic resin composition according to the present invention contains the resin other than the aromatic polycarbonate resin (A), in order to more effectively provide the advantageous effects of the present invention by containing the aromatic polycarbonate resin (A), the percentage of the aromatic polycarbonate resin (A) in all resin components contained in the thermoplastic resin composition according to the present invention is preferably 20% or more by mass.

Examples of resin additives include heat stabilizers, antioxidants, release agents, ultraviolet absorbers, dyes, pigments, flame retardants, anti-dripping agents, antistatic agents, anti-fogging agents, lubricants, anti-blocking agents, flow modifiers, plasticizers, dispersants, antibacterial agents, glass fibers, carbon fibers, inorganic fillers, and organic fibers.

These resin additives may be contained alone or in any combination of two or more in any proportion in the thermoplastic resin composition according to the present invention.

A method for producing the thermoplastic resin composition according to the present invention is not limited. Any known method for producing a thermoplastic resin composition can be widely employed. A specific example thereof is a method in which melt kneading is performed with a mixer, such as a Banbury mixer, a roll mill, a single-screw extruder, a twin-screw extruder, or a kneader.

The cover for a millimeter-wave radar according to the present invention is characterized by comprising the thermoplastic resin composition described above. The shape, pattern, color, dimensions, and so forth of the cover for a millimeter-wave radar according to the present invention are not limited and can be appropriately selected in accordance with the application of the cover for a millimeter-wave radar.

The cover for a millimeter-wave radar according to the present invention is characterized by having a relative dielectric constant $\varepsilon_r$ of 3.0 or less, a dielectric loss tangent tan $\delta$ of $8.0 \times 10^{-3}$ or less, and a loss factor $\varepsilon_r \cdot \tan \delta$ of $17.0 \times 10^{-3}$ or less, which are measured at a temperature of 25° C. and a frequency of 77 GHz.

The relative dielectric constant $\varepsilon_r$ represents the ratio to vacuum permittivity. A larger relative dielectric constant results in larger capacitance of the cover composed of a dielectric material, thus deteriorating the millimeter-wave transparency. From the point of view, the cover for a millimeter-wave radar according to the present invention preferably has a relative dielectric constant $\varepsilon_r$ of 2.9 or less, more preferably 2.8 or less, even more preferably 2.7 or less, particularly preferably 2.65 or less, most preferably 2.6 or less.

The dielectric loss tangent tan $\delta$ represents the degree to which a millimeter wave is partially lost as heat when passing through the cover composed of a dielectric material. A smaller dielectric loss tangent tan $\delta$ is preferred because the attenuation of the millimeter wave is low. From the point of view, the cover for a millimeter-wave radar according to the present invention preferably has a dielectric loss tangent tan $\delta$ of $7.0 \times 10^{-3}$ or less, more preferably $6.0 \times 10^{-3}$ or less, even more preferably $5.0 \times 10^{-3}$ or less, particularly preferably $4.0 \times 10^{-3}$ or less, most preferably $3.0 \times 10^{-3}$ or less.

The inventors also have found that the cover having best millimeter-wave transparency for a millimeter-wave radar can be provided in practical use when the loss factor $\varepsilon_r \cdot \tan \delta$, which is a product of the relative dielectric constant and the dielectric loss tangent, is low in addition to the low relative dielectric constant $\varepsilon_r$ and the low dielectric loss tangent tan $\delta$ described above. The dielectric loss, i.e., the power P consumed as heat in the dielectric material per unit volume, is represented by $\omega \cdot \varepsilon_r \cdot C_0 \cdot V^2 \cdot \tan \delta$ (where $\omega$: frequency, $C_0$: capacitance in vacuum, and V: voltage). The ease of heat generation depends on the loss factor $\varepsilon_r \cdot \tan \delta$ when the frequency and the voltage are constant. In other words, it can be said that a lower loss factor $\varepsilon_r \cdot \tan \delta$ results in lower energy loss due to the resistance component, thereby providing excellent millimeter-wave transparency with low self-heating. From the point of view, the cover for a millimeter-wave radar according to the present invention preferably has a loss factor $\varepsilon_r \cdot \tan \delta$ of $15.0 \times 10^{-3}$ or less, more preferably $13.0 \times 10^{-3}$ or less, even more preferably $12.0 \times 10^{-3}$ or less, particularly preferably $10.0 \times 10^{-3}$ or less, most preferably $9.0 \times 10^{-3}$ or less.

To control the relative dielectric constant $\varepsilon_r$, the dielectric loss tangent tan $\delta$, and the loss factor $\varepsilon_r \cdot \tan \delta$ of the cover for a millimeter-wave radar within the above range, it is essential to use a specific aromatic polycarbonate resin (A). Not only that, but it is important to appropriately select another component to be mixed. For example, metals and ceramic materials, such as silica, alumina, yttria, and zirconia, tend to increase the relative dielectric constant to increase the loss factor; thus, the mixing thereof should be avoided. It is also important to appropriately design the optimum thickness of the cover for a millimeter-wave radar in accordance with the frequency used as well as the resin used. Those skilled in the art can easily determine the optimum thickness by measuring the amount of attenuation of the millimeter wave.

The thickness of the cover for a millimeter-wave radar needs to be appropriately selected in consideration of the desired shape, the required mechanical strength, and the above-mentioned loss factor $\varepsilon_r \cdot \tan \delta$, and thus is not uniquely determined. The cover for a millimeter-wave radar preferably has a thickness of 1 to 10 mm, more preferably 1.2 to 8 mm, even more preferably 1.5 to 7 mm, particularly preferably 2 to 6 mm, most preferably 2.5 to 5 mm.

The cover for a millimeter-wave radar according to the present invention preferably has a transmission attenuation of −1.20 (dB) or more at a thickness of 3 mm (for example, a thickness of 2.7 to 3.3 mm) in a frequency band of 75 to 81 GHz. The transmission attenuation represents the amount of attenuation when the millimeter wave passes through the cover for a millimeter-wave radar. A transmission attenuation closer to zero indicates higher millimeter-wave transparency and is better. From the point of view, the transmission attenuation is more preferably −1.16 (dB) or more, even more preferably −1.15 (dB) or more, particularly preferably −1.13 (dB) or more, very particularly preferably −1.11 (dB) or more, most preferably −1.05 (dB) or more. This value is influenced by, for example, the materials used for the cover for a millimeter-wave radar, the frequency, and the thickness of the cover.

In the cover for a millimeter-wave radar according to the present invention, the difference $\Delta IL$ ($|IL_{MAX} - IL_{MIN}|$: absolute value) between the maximum transmission attenuation $IL_{MAX}$ and the minimum transmission attenuation $IL_{MIN}$ measured at every 1 GHz in a frequency band of 75 to 81 GHz at a thickness of 3 mm (for example, a thickness of 2.7 to 3.3 mm) is preferably 0.70 (dB) or less. The frequency band (frequency width) used by the millimeter-wave radar module has recently expanded from 0.5 GHz to 1 GHz, further 4 GHz in order to improve the sensing accuracy of an object. The cover for a millimeter-wave radar is required to have a lowest possible transmission attenuation for millimeter waves and, in addition, to have small variations in transmission attenuation over a wider frequency band. From the point of view, $\Delta IL$ is more preferably 0.50 (dB) or less, even more preferably 0.35 (dB) or less, particularly preferably 0.20 (dB) or less, most preferably 0.10 (dB) or less.

The relative dielectric constant $\varepsilon_r$, the dielectric loss tangent tan $\delta$, the loss factor $\varepsilon_r \cdot \tan \delta$, and the transmission attenuation of the cover for a millimeter-wave radar according to the present invention are values as a cover for a millimeter-wave radar. However, values obtained by measuring those properties of the thermoplastic resin composition according to the present invention at the same thickness as the cover described above can be used instead.

In the present invention, the transmission attenuation in the frequency band of 75 to 81 GHz and the difference $\Delta IL$ ($|IL_{MAX}-IL_{MIN}|$: absolute value) between the maximum transmission attenuation $IL_{MAX}$ and the minimum transmission attenuation $IL_{MIN}$ measured at every 1 GHz in the same frequency band are specified as values at a thickness of 3 mm. It is difficult to mold the thermoplastic resin composition to a thickness of exactly 3 mm. Thus, actually, the thickness may be in the range of 2.7 to 3.3 mm and is preferably in the range of 2.85 to 3.15 mm.

A measurement method is as follows: The transmission attenuation and the amount of phase shift are measured by a frequency change method in free space at 25° C. and measurement frequencies of 70 to 90 GHz. The relative dielectric constant $\varepsilon_r$, the dielectric loss tangent tan $\delta$, and the loss factor $\varepsilon_r \cdot \tan \delta$ are calculated from the results and the thickness. Regarding the relative dielectric constant $\varepsilon_r$, the dielectric loss tangent tan $\delta$, and the loss factor $\varepsilon_r \cdot \tan \delta$ in the present invention, values at a frequency of 77 GHz are used. Other detailed measurement conditions are described in examples.

Regarding the heat resistance of the thermoplastic resin composition used for the cover for a millimeter-wave radar according to the present invention, the temperature of deflection under load (unit: ° C.) is preferably 90° C. or higher when measured according to ISO 75-2 under high load (1.80 MPa). The temperature of deflection under load is a heat distortion temperature under a constant stress. A higher temperature of deflection under load indicates higher heat resistance and is preferred. Especially in the case where the cover for a millimeter-wave radar according to the present invention is used for an on-vehicle millimeter-wave radar module or the like, high heat resistance is required. Thus, general-purpose resins, such as styrene-based resins, e.g., ABS resins, AES resins, and ASA resins (temperature of deflection under load: 76° C. to 85° C.) and polypropylene resins (temperature of deflection under load: 50° C. to 60° C.) are insufficient. From the point of view, regarding the heat resistance of the thermoplastic resin composition used for the cover for a millimeter-wave radar according to the present invention, the temperature of deflection under load is more preferably 95° C. or higher, even more preferably 100° C. or higher, particularly preferably 110° C. or higher, most preferably 120° C. or higher.

The thermoplastic resin composition used for the cover for a millimeter-wave radar according to the present invention preferably has scratch resistance. The hardness of the article composed of the composition is preferably F or more in terms of pencil hardness measured under a load of 1,000 g according to JIS K5600-5-4. At an insufficiently low pencil hardness, the surface hardness of a product produced from the resin composition is low, and the surface is easily scratched during use of the product. The pencil hardness is preferably H or higher, particularly preferably 2H or higher. When the pencil hardness is a preferable value, the surface of the millimeter-wave radar is unlikely to be scratched even if it is wiped with a cloth or handled roughly.

Hitherto, in order to improve scratch resistance, various coatings have been formed on surfaces of thermoplastic resin compositions. Use of a composition having scratch resistance and having a suitable pencil hardness can reduce the cost, time, and effort for processing in treatment, such as coating.

A method for processing the thermoplastic resin composition according to the present invention into the cover for a millimeter-wave radar is not particularly limited. The cover is preferably obtained by injection molding because of its excellent dimensional accuracy and mass productivity. A method of the injection molding is not particularly limited, and any molding method commonly employed for thermoplastic resins can be employed. Examples thereof include an ultra-high-speed injection molding method, an injection compression molding method, a co-injection molding method, a blow molding method such as gas assist molding, a molding method using an adiabatic mold, a molding method using a rapid heating and cooling mold, foam molding (including supercritical fluid), insert molding, and an in-mold coating molding (IMC molding) method. Furthermore, a hot-runner molding method can also be employed.

The millimeter-wave radar module according to the present invention is characterized by including the cover for a millimeter-wave radar. The millimeter-wave radar module can be suitably used, for example, for on-vehicle millimeter-wave radars for use in, for example, automatic brake control systems, adaptive cruise control systems, pedestrian collision mitigation steering systems, false start suppression control systems, acceleration suppression systems when pedals are erroneously depressed, approaching vehicle warning systems, lane keeping assist systems, rear-end collision prevention and warning systems, parking assistance systems, and obstacle warning systems around vehicles; millimeter-wave radars for railways and aircraft for use in, for example, platform monitoring and crossing obstacle detection systems, in-train content transmission systems, streetcar/railway collision prevention systems, and devices for detecting foreign matter on runways; millimeter-wave radars for transportation infrastructure for use in, for example, intersection monitoring systems and elevator monitoring systems; millimeter-wave radars for various security devices; millimeter-wave radars for medical and nursing care for use in, for example, monitoring systems for children and seniors; and millimeter-wave radars for transmitting various information contents.

EXAMPLES

The present invention will be more specifically described below with reference to examples. The present invention, however, is not limited to the following examples. Any change can be made without departing from the gist of the present invention.

The values of various production conditions and evaluation results in the following examples have meanings as preferable values of the upper limit or the lower limit in the embodiments of the present invention. The preferable range may be a range defined by a combination of the above-mentioned upper limit or the lower limit and a value in the following examples or by a combination of values in the examples.

In the following description, the term "part(s)" refers to "part(s) by mass" on a mass basis, unless otherwise specified.

Production Examples 1 to 7: Production Example of Aromatic Polycarbonate Resin

Production examples of aromatic polycarbonate resin homopolymers having structural units (A), i.e., PC(A1), PC(A2), and PC(A3), and copolymers, i.e., PC(A4), PC(A5), PC(A8), and PC(B3) will be described below.

Aromatic dihydroxy compounds (a1, a2, b1, b2, and b3), diphenyl carbonate (DPC), and cesium carbonate (Cat) serving as a catalyst presented in Table 1 were accurately weighed in proportions given in Table 2 to prepare mixtures. Each of the mixtures was charged into a first reactor having an internal capacity of 200 L, the first reactor being equipped with a stirrer, a heating medium jacket, a vacuum pump, and a reflux condenser.

TABLE 1

| Code | Raw material |
|---|---|
| a1 | aromatic dihydroxy compound (a) 2,2-bis(4-hydroxy-3-methylphenyl)propane |
| a2 | aromatic dihydroxy compound (a) 2,2-bis(4-hydroxy-3,5-dimethylphenyl)propane |
| b1 | aromatic dihydroxy compound (b) 6,6'-dihydroxy-3,3,3',3'-tetramethyl-1,1-spirobiindane |
| b2 | aromatic dihydroxy compound (b) 2,2-bis(4-hydroxyphenyl)-3,3,5-trimethylcyclohexane |
| b3 | aromatic dihydroxy compound (b) 2,2-bis(4-hydroxyphenyl)propane (bisphenol A) |
| DPC | diphenyl carbonate |
| Cat | cesium carbonate |

An operation in which the pressure in the first reactor was reduced to 1.33 kPa (10 Torr) and then returned to atmospheric pressure with nitrogen was repeated five times to fill the inside of the first reactor with nitrogen. After nitrogen purging, a heating medium with a temperature of 230° C. was passed through the heating medium jacket to gradually increase the internal temperature of the first reactor, thereby dissolving the mixture. Then the stirrer was operated at 55 rpm. The internal temperature of the first reactor was maintained at 220° C. by controlling the temperature inside the heating medium jacket. The pressure in the first reactor was reduced from 101.3 kPa (760 Torr) to 13.3 kPa (100 Torr) in terms of absolute pressure over 40 minutes while phenol produced as a by-product of the oligomerization reaction of the aromatic dihydroxy compound and DPC in the first reactor was distilled off.

Subsequently, the pressure in the first reactor was maintained at 13.3 kPa, and a transesterification reaction was performed for 80 minutes while phenol was further distilled off.

The pressure in the system was then returned with nitrogen to 101.3 kPa in terms of absolute pressure and then increased to 0.2 MPa in terms of gauge pressure. The resulting oligomer in the first reactor was pressure-fed into a second reactor through a transfer pipe preheated to 200° C. or higher. The second reactor had an internal capacity of 200 L and was equipped with a stirrer, a heating medium jacket, a vacuum pump, and a reflux condenser. The internal pressure was atmospheric pressure. The internal temperature was controlled to 240° C.

The pressure-fed oligomer into the second reactor was then stirred at 16 rpm. The internal temperature was increased with the heating medium jacket. The pressure in the second reactor was reduced from 101.3 kPa to 13.3 kPa in terms of absolute pressure over 40 minutes. The temperature increase was continued, and the internal pressure was reduced from 13.3 kPa to 399 Pa (3 Torr) in terms of absolute pressure over another 40 minutes to remove the phenol distillate to the outside of the system. Furthermore, the temperature increase was continued. The absolute pressure in the second reactor reached 70 Pa (about 0.5 Torr). The polycondensation reaction was performed while the pressure was maintained at 70 Pa. The final internal temperature in the second reactor was 285° C. When the power of the stirrer of the second reactor required for stirring reached a predetermined value, the polycondensation reaction was terminated.

The pressure in the second reactor was returned with nitrogen to 101.3 kPa in terms of absolute pressure and then increased to 0.2 MPa in terms of gauge pressure. The aromatic polycarbonate resin was withdrawn in a strand form from the bottom of the second reactor and pelletized with a rotary cutter while cooling in a water tank.

The resulting pellets were blended with a four-fold molar amount of butyl p-toluenesulfonate with respect to cesium carbonate. The resulting blend was supplied to a twin-screw extruder, extruded in a strand form through the die of the extruder, and cut with a cutter to obtain each of the aromatic polycarbonate resins PC(A1) to PC(A5), PC(A8), and PC(B3) in which the polymerization catalyst was deactivated. Table 2 presents the measurement results of the viscosity-average molecular weights My of the resulting resins PC(A1) to PC(A5), PC(A8), and PC(B3).

TABLE 2

|  |  | Production example 1 | Production example 2 | Production example 3 | Production example 4 | Production example 5 | Production example 6 | Production example 7 |
|---|---|---|---|---|---|---|---|---|
| a1 | mol % | 100 | 100 |  | 50 | 50 | 50 |  |
| a2 |  |  |  | 100 | 50 |  |  |  |
| b1 |  |  |  |  |  | 50 |  |  |
| b2 |  |  |  |  |  |  |  | 40 |
| b3 |  |  |  |  |  |  | 50 | 60 |
| DPC |  | 103 | 103 | 102.5 | 102.5 | 102 | 102.5 | 102.5 |
| Cat |  | $1.5 \times 10^{-6}$ | $1.5 \times 10^{-6}$ | $2 \times 10^{-6}$ | $2 \times 10^{-6}$ | $3 \times 10^{-6}$ | $1.5 \times 10^{-6}$ | $3 \times 10^{-6}$ |
| Code of aromatic polycarbonate resin |  | PC(A1) | PC(A2) | PC(A3) | PC(A4) | PC(A5) | PC(A8) | PC(B3) |
| Viscosity-average molecular weight (Mv) |  | 20,600 | 25,400 | 16,500 | 21,000 | 18,500 | 22,900 | 15,800 |

[Another Resin Material and Additive]

Table 3 presents aromatic polycarbonate resins PC(B1) and PC(B2) having structural units (B) instead of the structural unit (A), a resin raw material other than the aromatic polycarbonate resin, and various resin additives.

TABLE 3

| Code | Raw material |
|---|---|
| PC(B1) | aromatic dihydroxy compound (b) 2,2-bis(4-hydroxy)propane-type aromatic polycarbonate resin "Novarex 7022J", available from Mitsubishi Engineering-Plastics Corporation Mv:21,000 |
| PC(B2) | aromatic dihydroxy compound (b) 2,2-bis(4-hydroxy)propane-type aromatic polycarbonate resin "Iupiron S-3000", available from Mitsubishi Engineering-Plastics Corporation Mv:21,000 |
| SMA | styrene-maleic anhydride copolymer "XIRAN SZ15170", available from POLYSCOPE mass-average molecular weight: 170,000 maleic anhydride unit content: 15% by mass |
| AD1 | heat stabilizer "Adeka Stab 2112", available from Adeka Corporation |
| AD2 | antioxidant "Irganox 1076", available from BASF |
| AD3 | release agent "Loxiol VPG861", available from Cognis Japan |
| AD4 | release agent "Unister M-9676", available from NOF Corporation |
| AD5 | ultraviolet absorber "Seesorb 709", available from Shipro Kasei Kaisha, Ltd. |

[Production Examples 8 to 11: Production Example of Resin Composition]

Production examples of blends of aromatic polycarbonate resins having structural units (A) and thermoplastic resin compositions will be described below.

Components given in Tables 2 and 3 were mixed in proportions (by mass) given in Table 4 with a tumbler for 20 minutes. The mixture was supplied to a 30-mm-diameter twin-screw extruder (TEX30a), available from The Japan Steel Works, LTD., equipped with a vent and kneaded at a screw rotation speed of 200 rpm, a discharge rate of 15 kg/hour, and a barrel temperature of 280° C. The molten resin was extruded in a strand form, rapidly cooled in a water tank, and pelletized with a pelletizer, thereby obtaining pellets of thermoplastic resin compositions PC(A6), PC(A7), PC(A9), and PC(A10).

TABLE 4

| Raw material |  | Production example 8 | Production example 9 | Production example 10 | Production example 11 |
|---|---|---|---|---|---|
| PC(A1) | Parts by mass | 46.93 | 18.30 |  | 15.00 |
| PC(A2) |  | 3.48 | 53.99 | 50.00 |  |
| PC(B1) |  | 33.28 |  |  |  |
| PC(B2) |  | 16.31 | 27.71 |  | 85.00 |
| PC(B3) |  |  |  | 50.00 |  |
| SMA |  |  | 43.37 |  |  |
| AD1 |  | 0.03 | 0.03 | 0.03 | 0.03 |
| AD2 |  | 0.1 | 0.1 | 0.1 | 0.1 |
| AD3 |  | 0.3 | 0.3 | 0.3 | 0.3 |
| AD4 |  | 0.1 | 0.1 | 0.1 | 0.1 |
| AD5 |  | 0.3 | 0.3 | 0.3 | 0.3 |
| Code of thermoplastic resin composition |  | PC(A6) | PC(A7) | PC(A9) | PC(A10) |

Examples 1 to 9 and Comparative Examples 1 and 2

<Measurement of Relative Dielectric Constant $\varepsilon_r$, Dielectric Loss Tangent tan δ, Loss Factor $\varepsilon_r \cdot$tan δ, and Transmission Attenuation>

The aromatic polycarbonate resins (PC(A1) and PC(A3) to PC(A10)) having the structural units (A) obtained by the above-described method and the aromatic polycarbonate resin (PC(B1)) having no structural unit (A) were dried at 100° C. for 6 hours with a hot-air dryer and then molded into molded articles measuring 100 mm×150 mm×3 mm or 5 mm in thickness with a ROBOSHOT S-2000i 150B injection molding machine, available from Funac Corporation.

Each of the resulting molded articles was set on a sample table having a diameter of 80 mm. The transmission attenuation and the amount of phase shift were measured (N=3) by a frequency change method in free space at 23° C. and a measurement frequency of 70 to 90 GHz with a WR10-VNAX millimeter-wave module available from Virginia Diodes Inc., an N5227A network analyzer available from Keysight Technologies, and DPS10-02 millimeter-wave•and microwave measurement system, available from KEYCOM Corp., equipped with a transmission attenuation measurement jig including a dielectric lens available from KEYCOM Corp.

The accurate thickness of each of the measured molded articles was measured with a digital micrometer, available from Shinwa Rules Co., Ltd. The relative dielectric constant $\varepsilon_r$, the dielectric loss tangent tan δ, and the loss factor $\varepsilon_r \cdot$tan δ at a frequency of 77 GHz were determined on the basis of the measurement results of the transmission attenuation, the amount of phase shift, and the thickness.

<ΔIL>

Among the resulting transmission attenuations measured at frequencies of 75, 76, 77, 78, 79, 80, and 81 GHz, the absolute value of the difference between the maximum value $IL_{MAX}$ and the minimum value $IL_{MIN}$ was calculated as ΔIL ($|IL_{MAX}-IL_{MIN}|$).

<Measurement of Temperature of Deflection Under Load>

The aromatic polycarbonate resins (PC(A1) and PC(A3) to PC(A10)) having the structural units (A) obtained by the above-described method and the aromatic polycarbonate resin (PC(B1)) having no structural unit (A) were dried at 100° C. for 6 hours with a hot-air dryer and then molded into 4-mm-thick molded articles with a J55AD injection molding machine, available from The Japan Steel Works, LTD., at a cylinder temperature of 280° C. and a mold temperature of 80° C. according to ISO 179-1,2. The resulting molded articles were used as test pieces. The temperature of deflection under load (unit: ° C.) was measured with a 6A-2 HDT tester, available from Toyo Seiki Seisaku-sho, Ltd., under high load (1.80 MPa) according to ISO 75-2.

<Pencil Hardness>

The aromatic polycarbonate resins (PC(A1) and PC(A3) to PC(A10)) having the structural units (A) obtained by the above-described method and the aromatic polycarbonate resin (PC(B1)) having no structural unit (A) were dried at 100° C. for 6 hours with a hot-air dryer and then subjected to injection molding into plates each having a thickness of 2 mm, a length of 100 mm, and a width of 100 mm with "SE100DU", available from Sumitomo Heavy Industries, Ltd., at a cylinder temperature of 280° C. and a mold temperature of 80° C. The pencil hardness of each of the resulting plates was measured under a load of 1,000 g with a pencil hardness tester (available from Toyo Seiki Seisaku-sho, Ltd.) according to JIS K 5600-5-4.

Table 5 presents the measurement results.

Table 5 demonstrates that the aromatic polycarbonate resin (A)-containing covers for millimeter-wave radars according to the present invention have excellent millimeter-wave transparency in the high frequency band of 76 to 81 GHz, high hardness, and excellent heat resistance. It can also be seen that the millimeter-wave transmission performance can be controlled by adjusting the thickness even when the same aromatic polycarbonate resin (A) is used.

The invention claimed is:

1. A cover for a millimeter-wave radar, the cover comprising a thermoplastic resin composition comprising an aromatic polycarbonate resin having a structural unit represented by formula (1),
   wherein the cover has a relative dielectric constant $\varepsilon_r$ of 3.0 or less, a dielectric loss tangent tan δ of $8.0\times10^{-3}$ or less, and a loss factor $\varepsilon_r \cdot \tan\delta$ of $17.0\times10^{-3}$ or less,

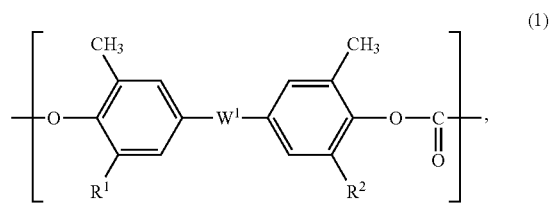

wherein in formula (1), $R^1$ and $R_2$ are each a hydrogen atom or a methyl group, and $W^1$ is at least one selected from the group consisting of a single bond, an oxygen atom, a sulfur atom, and a divalent organic group,
   wherein the cover is located on an antenna that transmits and/or receives a millimeter wave of 75 to 81 GHz frequency, and
   wherein the amount of the structural unit contained in the aromatic polycarbonate resin is 20 mol % or more based on all carbonate structural units.

TABLE 5

| | | Example 1 | Example 2 | Example 3 | Example 4 | Example 5 | Example 6 | Example 7 | Example 8 | Example 9 | Comparative example 1 | Comparative example 2 |
|---|---|---|---|---|---|---|---|---|---|---|---|---|
| Code of aromatic polycarbonate resin or thermoplastic resin composition | | PC(A1) | PC(A1) | PC(A3) | PC(A4) | PC(A5) | PC(A6) | PC(A7) | PC(A8) | PC(A9) | PC(B1) | PC(A10) |
| Percentage of structural unit (A) | mol % | 100 | 100 | 100 | 100 | 50 | 52.6 | 74.5 | 50 | 52.1 | 0 | 16.4 |
| Thickness | mm | 2.99 | 4.96 | 2.86 | 2.97 | 2.97 | 2.99 | 2.95 | 3.25 | 3.19 | 3.00 | 3.00 |
| Relative dielectric constant εr | — | 2.67 | 2.67 | 2.53 | 2.60 | 2.63 | 2.72 | 2.68 | 2.69 | 2.67 | 2.76 | 2.73 |
| Dielectric loss tangent tan δ | ×10⁻³ | 2.9 | 2.5 | 4.6 | 3.0 | 4.5 | 4.6 | 3.9 | 4.5 | 4.4 | 7.3 | 6.3 |
| Loss factor εr · tan δ | ×10⁻³ | 7.7 | 6.7 | 11.6 | 7.8 | 11.8 | 12.5 | 10.5 | 12.1 | 11.7 | 20.1 | 17.2 |
| Transmission attenuation at 75 GHz | dB | −1.07 | −0.14 | −0.67 | −0.95 | −1.03 | −1.16 | −1.05 | −0.93 | −1.03 | −1.29 | −1.22 |
| Transmission attenuation at 76 GHz | | −1.10 | −0.17 | −0.75 | −1.00 | −1.08 | −1.18 | −1.09 | −0.83 | −0.96 | −1.29 | −1.24 |
| Transmission attenuation at 77 GHz | | −1.11 | −0.26 | −0.83 | −1.04 | −1.11 | −1.17 | −1.12 | −0.73 | −0.87 | −1.27 | −1.23 |
| Transmission attenuation at 78 GHz | | −1.10 | −0.39 | −0.89 | −1.04 | −1.11 | −1.15 | −1.12 | −0.63 | −0.79 | −1.24 | −1.21 |
| Transmission attenuation at 79 GHz | | −1.06 | −0.56 | −0.94 | −1.04 | −1.10 | −1.11 | −1.11 | −0.53 | −0.69 | −1.17 | −1.16 |
| Transmission attenuation at 80 GHz | | −1.01 | −0.72 | −0.99 | −1.02 | −1.07 | −1.05 | −1.08 | −0.42 | −0.58 | −1.11 | −1.10 |
| Transmission attenuation at 81 GHz | | −0.95 | −0.88 | −1.02 | −0.98 | −1.04 | −0.98 | −1.04 | −0.35 | −0.49 | −1.02 | −1.03 |
| ΔIL | dB | 0.15 | 0.74 | 0.36 | 0.09 | 0.08 | 0.19 | 0.08 | 0.58 | 0.54 | 0.27 | 0.21 |
| Temperature of deflection under load | ° C. | 98 | 98 | 156 | 130 | 147 | 111 | 105 | 112 | 128 | 125 | 118 |
| Pencil hardness | — | 2H | 2H | 2H | 2H | H | H | 2H | F | H | 2B | HB |

2. The cover for a millimeter-wave radar according to claim 1, wherein the structural unit is represented by formula (3) or (4):

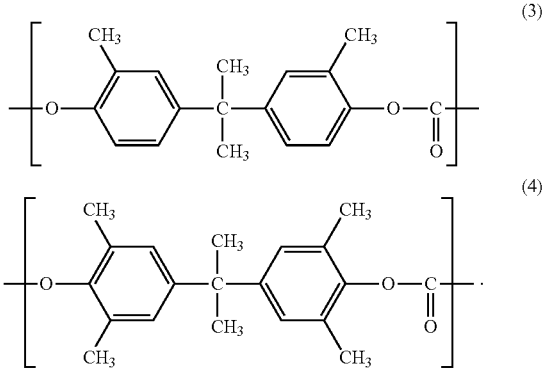

3. The cover for a millimeter-wave radar according to claim 1, wherein the amount of the structural unit contained in the aromatic polycarbonate resin is 50 mol % or more based on all carbonate structural units.

4. The cover for a millimeter-wave radar according to claim 1, wherein the cover has a transmission attenuation of −1.20 (dB) or more at a thickness of 3 mm in a frequency band of 75 to 81 GHz.

5. The cover for a millimeter-wave radar according to claim 1, wherein a difference $\Delta IL$ ($|IL_{MAX}-IL_{MIN}|$) between a maximum transmission attenuation $IL_{MAX}$ and a minimum transmission attenuation $IL_{MIN}$ at a thickness of 3 mm in a frequency band of 75 to 81 GHz is 0.70 (dB) or less.

6. The cover for a millimeter-wave radar according to claim 1, wherein the cover is a housing or an antenna cover that houses or protects an antenna module configured to transmit and/or receive a millimeter wave of 75 to 81 GHz frequency.

7. A millimeter-wave radar module, comprising the cover for a millimeter-wave radar according to claim 1.

8. The cover for a millimeter-wave radar according to claim 1, wherein the cover has a relative dielectric constant $\varepsilon_r$ of 2.72 or less and a dielectric loss tangent tan δ of $4.6 \times 10^{-3}$ or less.

* * * * *